US010460036B2

(12) United States Patent
Duong et al.

(10) Patent No.: US 10,460,036 B2
(45) Date of Patent: Oct. 29, 2019

(54) MULTI-LINGUAL SEMANTIC PARSER BASED ON TRANSFERRED LEARNING

(71) Applicant: VoiceBox Technologies Corporation, Bellevue, WA (US)

(72) Inventors: Long Duong, North Ryde (AU); Hadi Afshar, Marsfield (AU); Dominique Estival, Surry Hills (AU); Glen Pink, Drummoyne (AU); Philip Cohen, Brighton (AU); Mark Edward Johnson, Castle Cove (AU)

(73) Assignee: Voicebox Technologies Corporation, Bellevue, WA (US)

( * ) Notice: Subject to any disclaimer, the term of this patent is extended or adjusted under 35 U.S.C. 154(b) by 0 days.

(21) Appl. No.: 15/959,833

(22) Filed: Apr. 23, 2018

(65) Prior Publication Data
US 2018/0307679 A1  Oct. 25, 2018

Related U.S. Application Data

(60) Provisional application No. 62/488,838, filed on Apr. 23, 2017.

(51) Int. Cl.
*G06F 17/20* (2006.01)
*G06F 17/27* (2006.01)
(Continued)

(52) U.S. Cl.
CPC ...... *G06F 17/2785* (2013.01); *G06F 17/2705* (2013.01); *G06F 17/2735* (2013.01); *G06F 17/2827* (2013.01); *G06F 17/2836* (2013.01)

(58) Field of Classification Search
CPC ............ G06F 17/2705; G06F 17/2735; G06F 17/2785; G06F 17/2836
(Continued)

(56) References Cited

U.S. PATENT DOCUMENTS 7,848,915 B2 * 12/2010 Gao .................... G06F 17/2854
704/10
8,909,511 B2 * 12/2014 Liu ..................... G06F 17/2863
704/2

(Continued)

OTHER PUBLICATIONS

Dzmitry Bahdanau, KyungHyun Cho, Yoshua Bengio, Neural Machine Translation by Jointly Learning to Align and Translate, conference paper at ICLR 2015, 15 pages. (Year: 2015).*

(Continued)

*Primary Examiner* — Khai N. Nguyen
(74) *Attorney, Agent, or Firm* — Ohlandt, Greeley, Ruggiero & Perle, L.L.P.

(57) ABSTRACT

The disclosure relates to transferred learning from a first language (e.g., a source language for which a semantic parser has been defined) to a second language (e.g., a target language for which a semantic parser has not been defined). A system may use knowledge from a trained model in one language to model another language. For example, the system may transfer knowledge of a semantic parser from a first (e.g., source) language to a second (e.g., target) language. Such transfer of knowledge may occur and be useful when the first language has sufficient training data but the second language has insufficient training data. The foregoing transfer of knowledge may extend the semantic parser for multiple languages (e.g., the first language and the second language).

16 Claims, 5 Drawing Sheets

(51) Int. Cl.
*G06F 17/28* (2006.01)
*G10L 21/00* (2013.01)
*G10L 25/00* (2013.01)

(58) Field of Classification Search
USPC .......................................... 704/2, 8, 9, 277
See application file for complete search history.

(56) References Cited

U.S. PATENT DOCUMENTS

| | | | | |
|---|---|---|---|---|
| 9,613,027 | B2* | 4/2017 | Hwang | G06F 17/28 |
| 2006/0136352 | A1* | 6/2006 | Brun | G06F 17/2755 |
| 2006/0271920 | A1* | 11/2006 | Abouelsaadat | G06F 9/454 |
| | | | | 717/137 |
| 2008/0255845 | A1* | 10/2008 | Bennett | G06F 17/27 |
| | | | | 704/257 |
| 2013/0041647 | A1* | 2/2013 | Ramerth | G06F 17/2863 |
| | | | | 704/2 |
| 2016/0336008 | A1* | 11/2016 | Menezes | G10L 15/187 |
| 2018/0307679 | A1* | 10/2018 | Duong | G06F 17/2785 |

OTHER PUBLICATIONS

Long Duong, Hiroshi Kanayama, Tengfei Ma, Steven Bird, Trevor Cohn, Learning Crosslingual Word Embeddings without Bilingual Corpora, Proceedings of the 2016 Conference on Empirical Methods in Natuml hmguage Processing, Nov. 2016, pp. 1285-1295. (Year: 2016).*

International Search Report dated Jan. 24, 2019 from corresponding International (PCT) Patent Application No. PCT/IB2018/000935, 3 pages.

Written Opinion dated Jan. 24, 2019 from corresponding International (PCT) Patent Application No. PCT/IB2018/000935, 13 pages.

Bahdanau et al.; "Neural Machine Translation by Jointly Learning to Align and Translate", ICLR 2015, 15 pages.

Duong et al.; "Learning Crosslingual Word Embeddings without Bilingual Corpora", Proceedings of the 2016 Conference on Empirical Methods in Natural Language Processing, pp. 1285-1295, Nov. 2016.

* cited by examiner

MULTI-LINGUAL SEMANTIC PARSER BASED ON TRANSFERRED LEARNING

CROSS-REFERENCE TO RELATED APPLICATIONS

This application claims the benefit of U.S. Provisional Patent Application Ser. No. 62/488,838, entitled "MULTI-LINGUAL SEMANTIC PARSER BASED ON TRANSFERRED LEARNING", filed Apr. 23, 2017, which is hereby incorporated herein by reference in its entirety.

FIELD OF THE INVENTION

The invention relates to a system and method for generating, validating, and using a semantic parser capable of interpreting multiple languages and code switching based on multi-lingual training, including transfer of knowledge of a semantic parser for one language to another language, for use in natural language processing.

BACKGROUND

Semantic parsing is the task of mapping a natural language input (e.g., a natural language utterance or other input) to a logical form (such as Prolog or lambda calculus), which is easier for a computer to understand. Usually, the logical form can be executed directly through database query. Semantic parsing needs application or domain specific training data, so the conventional approach is to manufacture training data for each combination of language and application domain. Semantic parsing has mostly been developed for only certain languages (e.g., so-called high resource languages) because it is costly and time consuming to build.

Although techniques have been developed for transfer learning across domains, conventional systems have not used such transfer learning for languages for which semantic parsing has not been developed. For example, various transfer learning approaches may not work well for cross-lingual transfer learning (i.e., transfer from one language to another), because there may not be many shared features between the two languages.

These and other problems exist for developing semantic parsers for multiple languages, including for transfer learning across different languages.

SUMMARY

The invention addressing these and other drawbacks relates to a system and method for generating, validating, and using a semantic parser capable of interpreting multiple languages and code switching based on multi-lingual training for use in natural language processing. The system may generate a semantic parser that is able to understand inputs in multiple languages such as a first language and a second language. As used herein, the term "language" and similar terms such as "linguistic" and "lingual" refer to a structure of words or symbols that convey a meaning such as the English language, German language, Japanese language, etc.

The various systems and methods disclosed herein allow application domain specific training data in one language to improve performance and reduce the training data needs for the same application domain in another language. Such an application may address situations (among others) in which a single app must be developed for multiple languages simultaneously. Other uses and advantages will be apparent based on the disclosure herein.

In some implementations, the system performs cross-lingual learning from a first language (e.g., a source language for which a semantic parser has been defined) to a second language (e.g., a target language for which a semantic parser has not been defined). In some instances, data from multiple languages may be used simultaneously for training in order to generate a multi-lingual semantic parser. In some instances, the system may use knowledge from a trained model in one language to model another language. For example, the system may transfer knowledge of a semantic parser from a first (e.g., source) language to a second (e.g., target) language. Such transfer of knowledge may occur and be useful when the first language has sufficient training data but the second language has insufficient training data. The foregoing transfer of knowledge may extend the semantic parser for multiple languages (e.g., the first language and the second language). The extended semantic parser may be referred to herein as a multi-lingual semantic parser.

In some implementations, the system may generate cross-lingual word features such as word embeddings as a common link between languages while training linguistic models for semantic parsing. A preprocessed Wikipedia monolingual dump may be used to train the word embeddings. A translation dictionary for the first and second languages, a machine translator, or other translation source may be used to generate such cross-lingual word features. In some implementations, the cross-lingual features may be incorporated to a sequence-to-sequence model ("seq2seq model") applied for semantic parsing in order to extend it to a target language.

In some implementations, logical forms used by the multi-lingual semantic parser may use the same logical forms as the semantic parser prior to adaptation for one or more different languages.

In addition to extended semantic parsers for modeling low-resource languages, one benefit of joint training of the model is that the model has the capacity to understand both languages, which also allows the multi-lingual semantic to perform code-switching in which a natural language input contains a mixture of two languages. Thus, for example, multi-lingual inputs from users who make an utterance in two languages (e.g., one portion or word in English and another portion or word in German) may be parsed and understood by the multi-lingual semantic parser.

The multi-lingual parser may be used in various contexts. For example and without limitation, the multi-lingual parser may operate on a server device in communication over a network with an end user device (not illustrated) that receives a natural language utterance from a user. The natural language utterance may be in one of many languages (or include multiple languages in the natural language utterance). The end user device may transmit the natural language utterance (e.g. audio encoding of the utterance and/or text transcription of the utterance) to the server over a network for the server to perform natural language processing on the utterance using the multi-lingual semantic parser. Alternatively or additionally, the end user device may perform natural language processing on the utterance using the multi-lingual semantic parser. Additionally, all or some of the utterance may be processed locally at the end user device while all or some of the utterance is also processed remotely at the server.

The multi-lingual semantic parser may parse the natural language utterance to determine its intent, so long as the utterance includes a language for which the multi-lingual semantic parser has been directly trained or has been extended. In some instances, once the intent is determined a response may be generated by the server and/or the end user device. The response may be in the same language as the input language (or the same language as the predominant language—the language in which a majority words of the input utterance was made). Alternatively, based on the intent, the output may be made in an appropriate language (e.g., for requests such as "how do you say 'where is the restroom' in German."

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
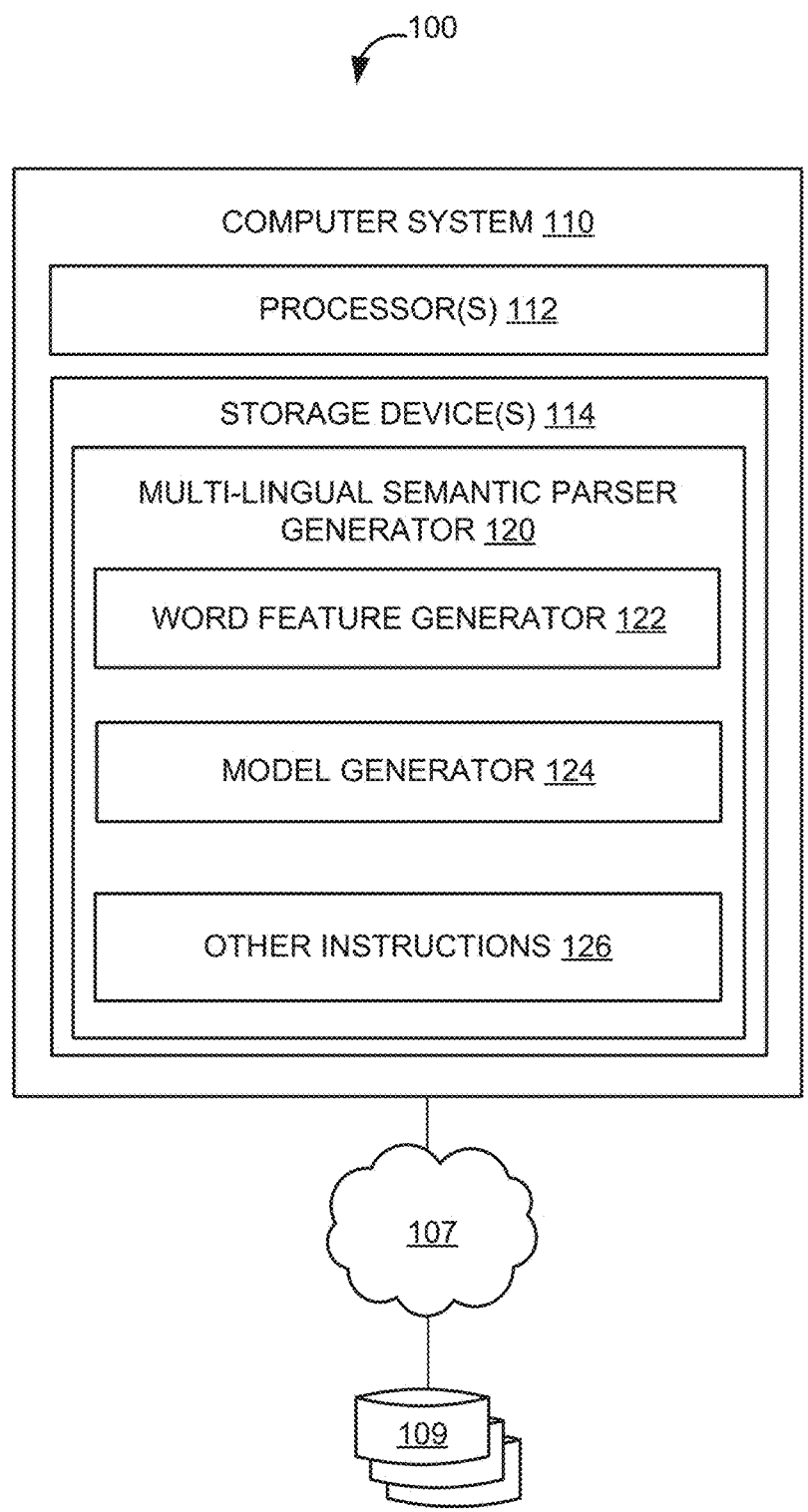
FIG. 1 illustrates a system for generating a multi-lingual semantic parser based on multi-lingual training for use in natural language processing, according to an implementation of the invention.

The invention relates to a system and method for generating, validating, and using a semantic parser capable of interpreting multiple languages and code switching based on multi-lingual training for use in natural language processing. The system may generate a semantic parser that is able to understand inputs in multiple languages such as a first language and a second language. As used herein, the term "language" and similar terms such as "linguistic" and "lingual" refer to a structure of words or symbols that convey a meaning such as the English language, German language, Japanese language, etc.

In some implementations, the system performs cross-lingual learning from a first language (e.g., a source language for which a semantic parser has been defined) to a second language (e.g., a target language for which a semantic parser has not been defined). In some instances, data from multiple languages may be used simultaneously for training in order to generate a multi-lingual semantic parser. In some instances, the system may use knowledge from a trained model in one language to model another language. For example, the system may transfer knowledge of a semantic parser from a first (e.g., source) language to a second (e.g., target) language. Such transfer of knowledge may occur and be useful when the first language has sufficient training data but the second language has insufficient training data. The foregoing transfer of knowledge may extend the semantic parser for multiple languages (e.g., the first language and the second language). The extended semantic parser may be referred to herein as a multi-lingual semantic parser.

In some implementations, the system may generate cross-lingual word features such as word embeddings as a common link between languages while training linguistic models for semantic parsing. A translation dictionary for the first and second languages, a machine translator, or other translation source may be used to generate such cross-lingual word features. In some implementations, the cross-lingual features may be incorporated to a sequence-to-sequence model ("seq2seq model") applied for semantic parsing in order to extend it to a target language. The seq2seq model has been described in "*Neural machine translation by jointly learning to align and translate*" by Dzmitry Bandanau, Kyunghyun Cho, and Yoshua Bengio (2014) [CoRR abs/1409.0473. http://arxiv.org/abs/1409.0473], the contents of which is incorporated by reference in its entirety herein.

In some implementations, logical forms used by the multi-lingual semantic parser may use the same logical forms as the semantic parser prior to adaptation for one or more different languages.

In addition to extended semantic parsers for modeling low-resource languages, one benefit of joint training of the model is that the model has the capacity to understand both languages, which also allows the multi-lingual semantic to perform code-switching in which a natural language input contains a mixture of two languages. Thus, for example, multi-lingual inputs from users who make an utterance in two languages (e.g., one portion or word in English and another portion or word in German) may be parsed and understood by the multi-lingual semantic parser.

FIG. 1 illustrates a system 100 for generating a multi-lingual semantic parser based on multi-lingual training for use in natural language processing, according to an implementation of the invention. In an implementation, system 100 may include a computer system 110, a database 109, and/or other components. Each component of system 100 may be communicably coupled to one another by one or more computer networks 107. Database 109 may be configured to store information relating to the features and functions described herein. For example, and without limitation, database 109 may be configured to store various information described herein, such as various training data, dictionaries, machine translation instructions, and/or other information.

Computer System 110

Computer system 110 may be configured as a server, a desktop computer, a laptop computer, and/or other device that can be programmed to collect and validate data for and generate a semantic parser for natural language processing, as described herein. Computer system 110 may include one or more processors 112 (also interchangeably referred to herein as processors 112, processor(s) 112, or processor 112 for convenience), one or more storage devices 114 (which may store various instructions described herein), and/or other components. Processors 112 may be programmed by one or more computer program instructions. For example, processors 112 may be programmed by multi-lingual semantic parser generator 120.

As illustrated, multi-lingual semantic parser generator 120 may include a word feature generator 122, a model generator 124, and/or other instructions 126 that program computer system 110 to perform various operations. As used herein, for convenience, the various instructions will be described as performing an operation, when, in fact, the various instructions program the processors 112 (and therefore computer system 110) to perform the operation.

Generating Cross-Lingual Word Features

In an implementation, word feature generator 122 may generate cross-lingual word features (such as cross-lingual word embeddings) across first (e.g., source) and second (e.g., target) languages. To do so, word feature generator 122 may use the context in one language to predict the target word in another language. The candidate words in the other language may be given by a translation source such as a bilingual dictionary, a machine translator, or other translation source. Word embeddings are described in "*Learning crosslingual word embeddings without bilingual corpora*" by Long Duong, Hiroshi Kanayama, Tengfei Ma, Steven Bird, and Trevor Cohn, In Proceedings of the 2016 Conference on Empirical Methods in Natural Language Processing. Association for Computational Linguistics, Austin, Tex., pages 1285-1295 (2016), the contents of which is incorporated by reference in its entirety herein.

In an implementation, the source embeddings of both languages with the cross-lingual word embeddings may be initialized. However, in some implementations, unlike Duong (2016), which is incorporated above, system 100 stops the gradient update for these embeddings. Otherwise, they may not stay in same space and thus may not be comparable. The system 100 may apply cross-lingual word embeddings (+XlingEmb) to the "All model" and the "Dual encoder model" described below and jointly train for the source and target language.

Models for Learning from Multi-Lingual Training Data

Figure 3:
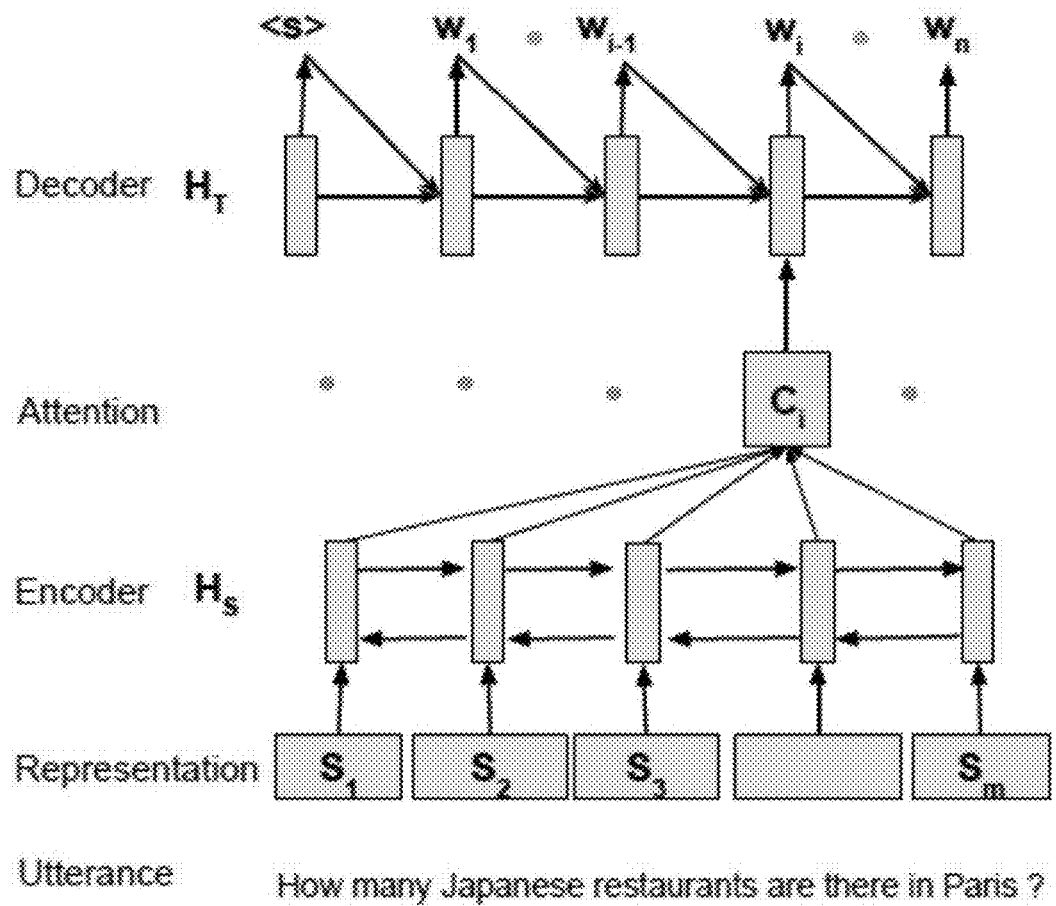
FIG. 3 illustrates a diagram of a model used for generating a multi-lingual semantic parser, according to an implementation of the invention.

In an implementation, model generator 124 may generate a seq2seq model with attention. This model encodes a source input as a sequence of vectors, and generates output by decoding these sequences. At each decoding time step, the model "attends" to different parts of the encoded sequence. Referring to FIG. 3, the source utterance is represented as a sequence of vectors $S_1, S_2, \ldots, S_m$. Each Vector S is the output of an embeddings lookup. The model may include an encoder and a decoder. The encoder may include a bidirectional recurrent neural network (RNN) with Gated Recurrent Units (GRU). An RNN with GRU is described in "Sequence modeling using gated recurrent neural networks" by Mohammad Pezeshki, [CoRR abs/1501.00299] [http://arxiv.org/abs/1501.00299] (2015), the contents of which is incorporated by reference in its entirety herein.

The source utterance may be encoded as a sequence of vectors $HS = H_s^1, H_s^2, \ldots, H_s^m$ where each vector $H_s^j$ ($1 \leq j \leq m$) is the concatenation of the hidden states of the forward and backward GRU at time j. The attention mechanism is added to the model through an alignment matrix:

$$\alpha \in \mathbb{R}^{n \times m}$$

where n is the number of target tokens in the logical form.

Model generator 124 may add start and end delimiters (e.g., "<s>" and "</s>") to mark the start and end of a target sentence. The "glimpse" vector $c_i$ of the source when generating $w_i$ is given by:

$$c_i = \Sigma_j \alpha_{ij} H_s^j$$

The decoder may include another RNN with GRU units. At each time step, the decoder Long Short Term Memory ("LSTM") receives $c_i$ in addition to the previously output word. Thus, the hidden state at time i of the decoder may defined as $$H_T^i = GRU(H_T^{i-1}, c_i, w_{i-1}),$$

which is used to predict word $w_i$:

$$p(w_i | w_1 \ldots w_{i-1}, H_S) = \text{softmax}(g(H_T^i))$$

where g is an affine transformation.

Model generator 124 may use 70 dimensions for both the hidden states and memory cells in the source GRUs and 60 dimensions for target GRUs. Model generator 124 may train this model using RMSprop on the negative log-likelihood using a mini-batch of 256 and early stopping on development data. RMSprop is described in "Lecture 6.5—RmsProp: Divide the gradient by a running average of its recent magnitude" by Tieleman and Hinton [COURSERA: Neural Networks for Machine Learning] (2012), the content of which is incorporated by reference in its entirety herein. The initial learning rate may be 0.002 and may be decayed with a decay rate 0.1 if improvement has not been observed after 1000 iterations. The gradients may be rescaled if their l2 norm is greater than 10. Dropout for both source and target GRUs units may be implemented with input and output dropout rates of 40% and 25% respectively. The initial state of the source GRU is trainable, and the initial state of target GRU is initialized with last state of the source GRUs. The non embeddings weights are initialized using Xavier initialization, which is described in "Understanding the difficulty of training deep feedforward neural networks," by Glorot and Bengio, *Proceedings of the Thirteenth International Conference on Artificial Intelligence and Statistics*. PMLR, Chia Laguna Resort, Sardinia, Italy, volume 9 of *Proceedings of Machine Learning Research*, pages 249-256. (2010), the content of which is incorporated by reference in its entirety herein.

In some implementations, model generator 124 may tune the base attentional model on the development data by generating different configurations which are permutations of different optimizers, source and target RNN sizes, RNN cell type 3, dropout rates and mini-batch sizes.

In some implementations, model generator 124 may initialize the word embeddings in the model with pre-trained monolingual word embeddings trained on a Wikipedia dump using word2vec. Word2vec is described in "Linguistic regularities in continuous space word representations," by Tomas Mikolov, Wen-tau Yih, and Geoffrey Zweig, In Proceedings of the 2013 Conference of the North American Chapter of the Association for Computational Linguistics: Human Language Technologies. Association for Computational Linguistics, Atlanta, Ga., pages 746-751, [http://www.aclweb.org/anthology/N13-1090] (2013), the content of which is incorporated by reference in its entirety herein.

In some implementations, model generator 124 may exploit a simple method to handle unknown words. During training, all words that are of low frequency and capitalized may be replaced with a symbol, such as "UNK." Other symbol(s) may be used as well. Effectively, low frequency named entities in the dataset may be targeted. Alternatively or additionally, named entity recognition may be used. However, unlike conventional systems, the original sentence (or other data) in the training data is retained. During test time, (from left to right) the UNK symbol in the logical form is replaced with the corresponding word in the source utterance.

Transferred Learning

Dual Model

Figure 4:
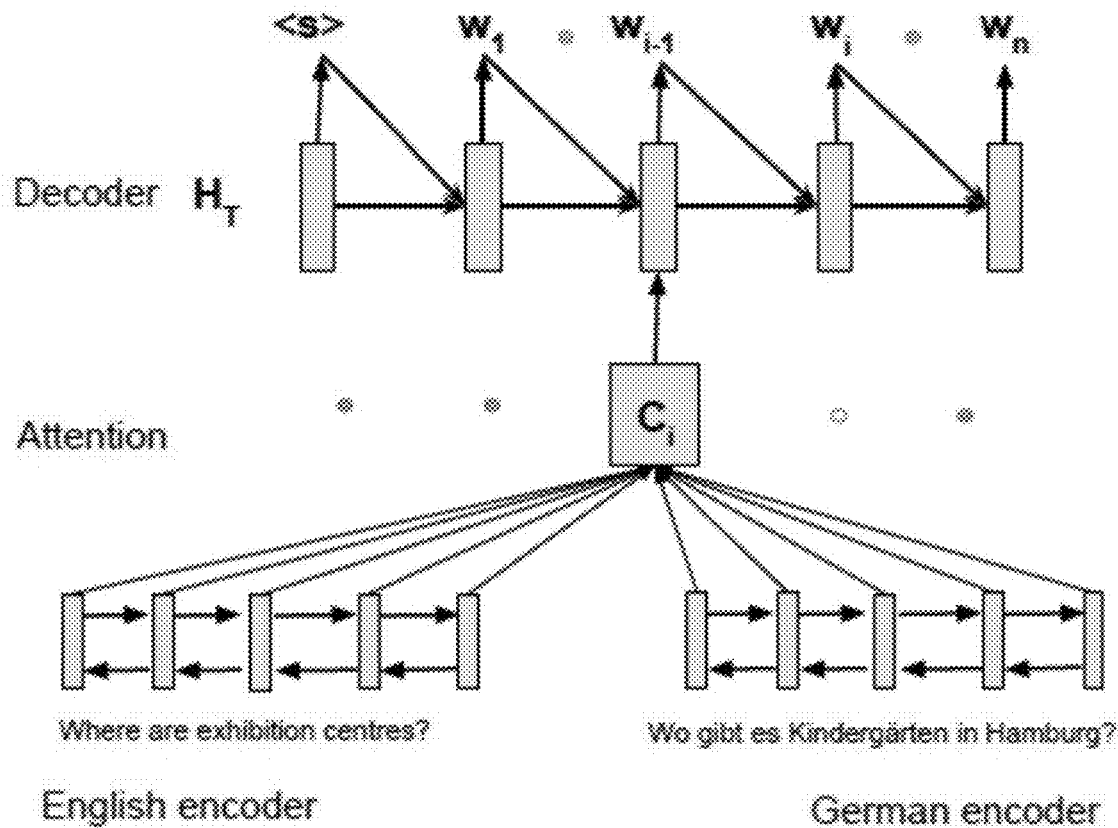
FIG. 4 illustrates a diagram illustrating a dual encoder and single decoder model for generating a multi-lingual semantic parser, according to an implementation of the invention.

The system may extend the base attentional model described above to dual encoders, one for a first (e.g., source) language and another for a second (e.g., target) language. For example, English may be used as a source language and German used as a target language, in both directions (dependent on the model). The decoder is shared across languages as illustrated in FIG. 4. The foregoing may be referred to as a "Dual model." The glimpse vector $c_t$ will be calculated using either the source or target RNN encoder, because both source and target languages may use the same target logical form. The model may be trained on the combined data of both the source and target languages. For each minibatch, source or target language data may be fetched and the corresponding RNN encoder may be used to encode vectors.

All Model

In some implementations, model generator 124 may create a new training data set $$D_{all}=D_s \cup D_t$$

where $D_s$ and $D_t$ are the training data for source and target language, respectively. This may be referred to as the "All model." The All model may be understood as a Dual model, but instead of just the target RNN, both source and target RNNs are shared, only the embedding matrices are different between source and target languages.

Validation and Evaluation

In an implementation, the NLmaps corpus, which is a semantic parsing corpus for English and German, was used to train the models described herein. Examples of pairs of utterance and logical form are given in Table 1 below.

TABLE 1

Examples of training data in pairs of natural utterance and logical form in the NLmaps corpus for English (en) and German (de).

| | |
|---|---|
| en | Where are kindergartens in Hamburg?<br>query (area(keyval('name','Hamburg')),<br>nwr(keyval('amenity','kindergarten')),qtype(latlong)) |
| de | Wie viele Second Hand Laden gibt es im Suden von Edinburgh?<br>query(south(area(keyval('name','City of Edinburgh')),<br>nwr(keyval('second hand','only'))),qtype(count)) |

The utterances are in different languages but the logical forms are in the same format. In some implementations, entries of the corpus may be tokenized by, for example, and without limitation, removing quotes, adding spaces around "("and")" and separate any question mark at the end of an utterance. For each language, the corpus contains 1500 pairs of natural language and corresponding logical form for training and 880 pairs for testing. In some instances, approximately 10% of the training set is used as development data for early stopping and hyper-parameter tuning. For evaluation, exact match accuracy may be used for the logical form.

Figure 5:
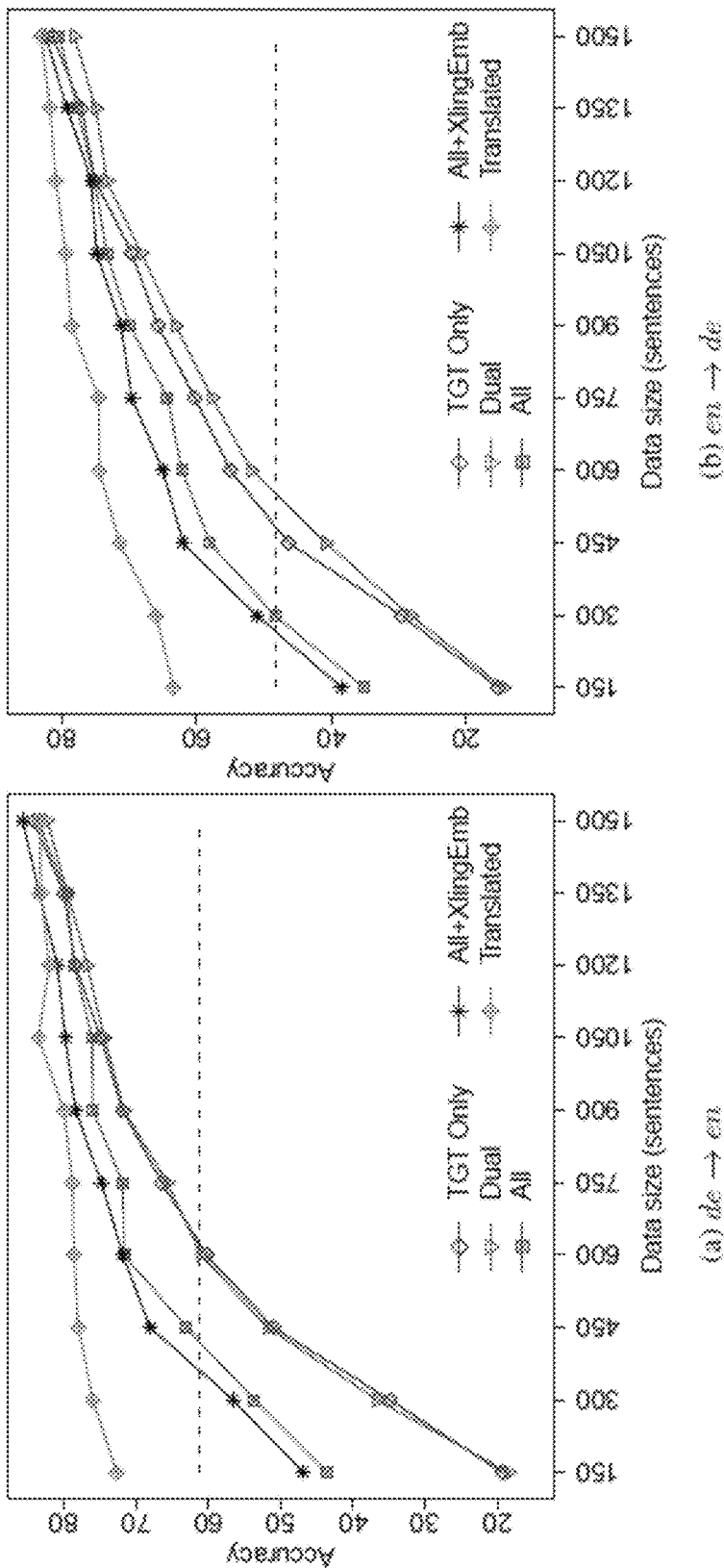
FIG. 5 illustrates learning curves for various models, according to an implementation of the invention.

Referring to FIG. 5, the learning curve is illustrated for transfer learning in both directions. The cross-lingual word embeddings is trained on a preprocessed Wikipedia monolingual dump with a bilingual dictionary between English and German. The machine translation system may include one or more machine translation systems.

TGT Only apply the base attentional mode to the target language data alone. Dual uses the dual encoders. All is similar with TGT Only but trained on the combined data of both languages. All+XlingEmb additionally uses crosslingual word embeddings. Translated model uses a machine translation system. At 1500 sentences, since development data may not be available for early stopping, the model may be trained for 10,000 iterations.

Note the baseline attentional model trained on the target only (TGT Only) is robust for the high-resource scenario but performs poorly for the low-resource scenario. The Dual model performs similar with the baseline attentional model for English and slightly worse for German. The simple method of combining the data (All model) performs surprisingly well, especially in the low-resource scenario where this model is •20% better than the baseline attentional model for both languages. Incorporating cross-lingual word embeddings (+XlingEmb) consistently improves the performance for all data sizes. The improvement is more marked for the en ! de direction. Finally, if a machine translation system is used, the performance on a target language is further improved by augmenting the data with translation from the source language. This technique may substantially improve performance on a target language, especially in the low-resource scenario. If no target language data is used and the system trains on Dtrans=translate(Ds) the system may achieve 61.3% and 48.2% accuracy for English and German respectively. This corresponds to the distant supervision baseline where the training data is "silver" given by a machine translation system. This baseline is equivalent with supervised learning on 600 and 450 gold sentences on English and German respectively.

By jointly training the model on both English and German, the system may also handle code-switching data, where a natural language utterance is a mixture of two or more languages such as English and German. (A typical example of codeswitching would be "How many hospitals gibt es in Paris?"). An ability to handle the foregoing and other code-switching data results even though, in various implementations, the models are only trained on "pure" English and German utterances without code-switching training examples in their input.

In some implementations, a code switching test dataset was created by a fluent bilingual speaker who generated codeswitching utterances for each of the 880 examples in the NLmaps test set. Approximately half of the utterances are "Denglish" (i.e., a German phrase embedded in an English matrix sentence) and half are "Gamerican" (an English phrase embedded in a German matrix sentence). The NLmaps corpus includes with English and German utterances for each test example, and where possible our code-switching utterance was a combination of these (some of our code-switching examples diverge from the corresponding English and German utterances if this improves fluency). The code switching test dataset was then analyzed using the models and multi-lingual parser generated as described herein.

TABLE 2

| Model | Accuracy |
|---|---|
| German TGT Only | 14.8 |
| English TGT Only | 15.9 |
| All | 76.7 |
| All+XlingEmb | 78.0 |

Table 2 illustrates results of models on the code-switching dataset. The results make clear that the All+XlingEmb model performs noticeably better than the baseline monolingual models on the code-switching test examples, even though there were no code-switching examples in the training set for any of the models.

Reference will be made to FIG. 3, which illustrates a flow diagram of a process for generating a semantic parser based on automatically generated operators and user-designated utterances relating to the operators for use in natural language processing, and examples of system components illustrated in FIG. 2 that may be programmed to perform the process.

Figure 2:
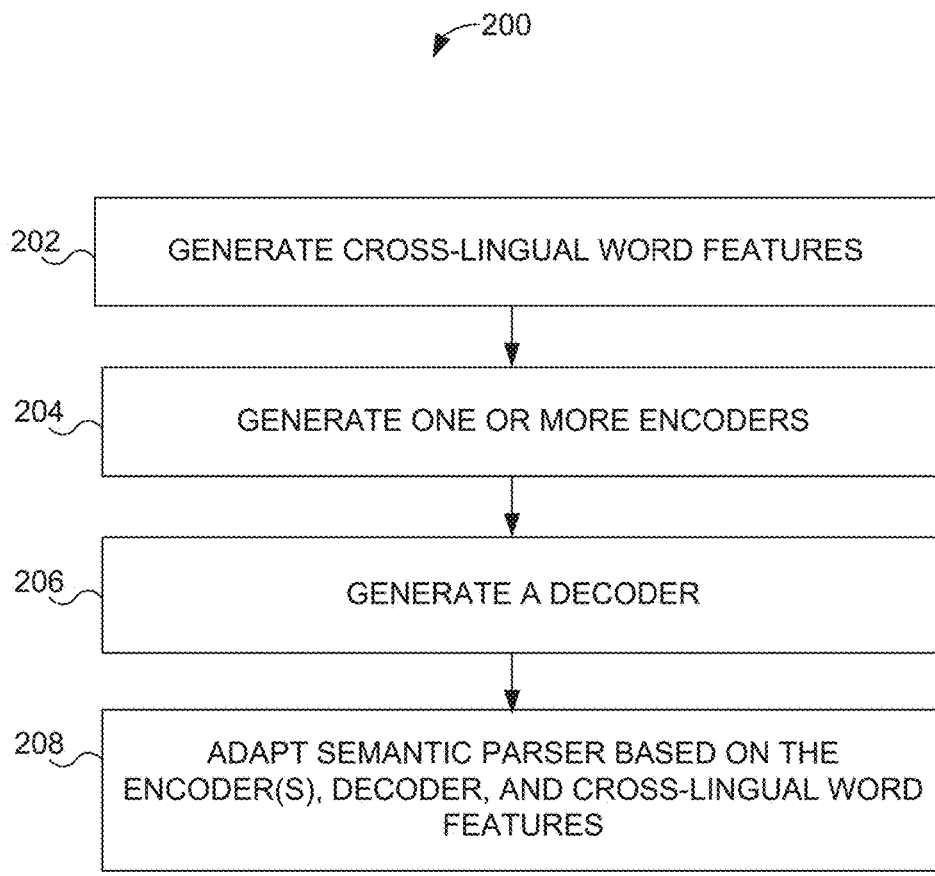
FIG. 2 illustrates a flow diagram of a process for generating a multi-lingual semantic parser based on multi-lingual training for use in natural language processing, according to an implementation of the invention.

FIG. 2 illustrates a flow diagram of a process for generating a multi-lingual semantic parser based on multi-lingual training for use in natural language processing, according to an implementation of the invention.

In an operation 202, cross-lingual word features (e.g., word embeddings to initialize a seq2seq with attention model). For example, a feature training dataset such as a preprocessed Wikipedia data dump in English may be used to determine meanings of a source word (e.g., English) in a target language such as German. Each word embedding may convey the meaning of a given word (in context). For example, the context of a given word in a sentence of the feature training dataset may be used to determine its translation (e.g., "bank" in English might correspond to a financial bank or a river bank. In another language, financial "bank" and river "bank" could be different words. The context of previous words in the English sentence is used to disambiguate which word applies). To find such translations in view of context, a translation source such as a bilingual dictionary for the target and source languages or a machine translation system may be used. In some instances, the foregoing may be repeated for a feature training dataset in the target language. In some instances, joint training may be performed, in which the meaning of a word in each language is predicted (e.g., predict what the English word "bank" means even though the training data says "bank" and then determine what that word means in German using a dictionary or machine learning).

In an operation 204, one or more encoders may be generated. In some instances, at least two encoders may be generated—one for the source language and one for the target language. The source encoder may encode utterance inputs in a source language and encode them into vectors each corresponding to a word based on the source language (including its target language counterpart based on the word embeddings). The target encoder may do the same, but for the target language. Each encoder may represent an RNN that is used to analyze a series of input words in a given utterance.

In an operation 206, a decoder may be generated. In some instances, a single decoder may be generated, which may take as input the output of a source encoder and target encoder. The decoder may determine the meaning of a word for each vector.

In an operation 208, a semantic parser may be adapted to process a source language based on the encoders, decoder, and cross-lingual word features. For example, the process may obtain a multi-lingual training data (e.g., the NLMaps corpus in English and German. This training set has queries relating to maps/navigation in both English and German). The encoders and decoders may be used to analyze the multi-lingual training data to train linguistic models for generating semantic parsers capable of processing natural language utterances in multiple languages. For example, logical forms may be generated based on the determined meanings of words and their associated translations. A logical form is a machine readable version of a meaning of an utterance. Once adapted, the multi-lingual semantic parser may interpret natural language utterances, some or all of which may be made using the source language.

The one or more processors 112 illustrated in FIG. 1 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network 107, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein.

What is claimed is:

1. A system of generating a multi-lingual semantic parser based on transferred learning from a first language having sufficient training data to a second language having insufficient training data, the system comprising:
   a computer system programmed to:
   obtain a corpus of words in the first language;
   generate a plurality of cross-lingual word features that each predicts a target word in the second language that corresponds to a respective source word in the corpus of words based on contextual information in the corpus of words and a translation of the respective source word from the first language to the second language;
   obtain at least a first predefined utterance in the first language;
   encode, using at least a first encoder, the first predefined utterance as a plurality of first vectors, wherein each first vector is based on a lookup of the plurality of cross-lingual word features using a corresponding word in the first predefined utterance;
   decode, using a decoder, the plurality of first vectors to generate one or more words in the second language corresponding to the first predefined utterance in the first language; and
   adapt a semantic parser trained on the first language based at least on the decoded plurality of first vectors to generate the multi-lingual semantic parser that parses utterances having one or more words in the second language and utterances having one or more words in the first language.

2. The system of claim 1, wherein to generate the plurality of cross-lingual word features, the computer system is programmed to:
   determine a context of a first word of the corpus of words based on one or more words adjacent to the first word in the corpus of words.

3. The system of claim 1, wherein the computer system is further programmed to:
   obtain at least the first predefined utterance in the second language, wherein the first predefined utterance in the first language and the first predefined utterance in the second language is obtained from a predefined training dataset;
   encode, using at least a second encoder, the first predefined utterance in the second language as a plurality of second vectors, wherein each second vector is based on a lookup of the plurality of cross-lingual word features using a corresponding word in the second predefined utterance;
   decode, using a decoder, the plurality of second vectors to generate one or more words in the first language corresponding to the first predefined utterance in the second language; and
   wherein the semantic parser is further adapted based on the decoded plurality of second vectors.

4. The system of claim 3, wherein the computer system is further programmed to:
   define and use a logical form having a single format for both the first predefined utterance in the first language and the first predefined utterance in the second language.

5. The system of claim 1, wherein the translation of the respective source word from the first language to the second language is via a dictionary or machine translation.

6. The system of claim 1, wherein to decode the plurality of first vectors, the computer system is programmed to:
   for at least a first vector among the plurality of vectors, attend to different parts of the plurality of vectors to decode the first vector.

7. The system of claim 1, wherein the computer system is further programmed to:
   initialize the plurality of cross-lingual word features with pre-trained word embeddings trained on a second corpus of words in the first language.

8. The system of claim 1, wherein the computer system is further programmed to:
   identify a low frequency word in the corpus of words;
   replace the low frequency word with a symbol; and
   target the symbol during training for disambiguate the low frequency word.

9. The system of claim 1, wherein the computer system is further programmed to:
   identify a low frequency word in the corpus of words;
   replace the low frequency word with a symbol; and
   obtain an identification of an entity associated with the low frequency word based on named entity recognition input.

10. The system of claim 1, wherein the computer system is further programmed to:
    receive a natural language utterance comprising one or more words in the second language; and
    use the multi-lingual semantic parser to parse the natural language utterance.

11. The system of claim 10, wherein the natural language utterance further comprises one or more words in the first language, and wherein the multi-lingual semantic parser to parse the one or more words in the first language natural language utterance.

12. The system of claim 11, wherein the computer system is further programmed to:
    identify a predominant one of the first language or the second language in the natural language utterance; and
    generate a response to the natural language utterance in the predominant one of the first language or the second language in the natural language utterance.

13. The system of claim 11, wherein the computer system is further programmed to:
    identify a requested language output from the natural language utterance; and
    generate a response to the natural language utterance in the requested language.

14. The system of claim 1, wherein the corpus of words relates to a single domain of information.

15. A computer-implemented method of generating a multi-lingual semantic parser based on transferred learning from a first language having sufficient training data to a second language having insufficient training data, the method being implemented on a computer system, the method comprising:
    obtaining a corpus of words in the first language;
    generating a plurality of cross-lingual word features that each predicts a target word in the second language that corresponds to a respective source word in the corpus of words based on contextual information in the corpus of words and a translation of the respective source word from the first language to the second language;

obtaining at least a first predefined utterance in the first language;

encoding, using at least a first encoder, the first predefined utterance as a plurality of first vectors, wherein each first vector is based on a lookup of the plurality of cross-lingual word features using a corresponding word in the first predefined utterance;

decoding, using a decoder, the plurality of first vectors to generate one or more words in the second language corresponding to the first predefined utterance in the first language; and adapting a semantic parser trained on the first language based at least on the decoded plurality of first vectors to generate the multi-lingual semantic parser that parses utterances having one or more words in the second language and utterances having one or more words in the first language.

16. The computer-implemented method of claim 15, wherein generating the plurality of cross-lingual word features comprises:

determining a context of a first word of the corpus of words based on one or more words adjacent to the first word in the corpus of words.

\* \* \* \* \*